United States Patent [19]

Jacobson

[11] Patent Number: 4,628,840
[45] Date of Patent: Dec. 16, 1986

[54] COMBINATION COULTER AND FERTILIZER KNIFE APPARATUS

[75] Inventor: Calvin L. Jacobson, Harlan, Iowa

[73] Assignee: Harlan Manufacturing Company, Harlan, Iowa

[21] Appl. No.: 683,398

[22] Filed: Dec. 19, 1984

[51] Int. Cl.⁴ ............................................. A01C 23/00
[52] U.S. Cl. ...................................... 111/7; 172/558; 172/572; 172/166
[58] Field of Search ............... 172/572, 573, 166, 710, 172/180, 145, 558; 111/6, 7, 87

[56] References Cited

U.S. PATENT DOCUMENTS

| 2,489,385 | 11/1947 | Paul | 172/558 |
| 3,237,577 | 3/1966 | Wilkins | 111/7 |
| 3,319,589 | 5/1967 | Moran | 172/166 |
| 3,799,079 | 3/1974 | Dietrich | 172/145 |
| 4,466,364 | 8/1984 | Hassenfritz | 172/166 |
| 4,538,532 | 9/1985 | Coker | 172/166 |

FOREIGN PATENT DOCUMENTS

| 1430726 | 1/1966 | France . | |
| 89932 | 9/1967 | France | 111/87 |
| 1098018 | 1/1968 | United Kingdom | 111/87 |

OTHER PUBLICATIONS

Disc-Chisel Coulters-Implement and Tractor, Jul. 15, 1981, p. 35, Yetter Mfg. Co. Colchester, Ill.
"Fight Back", Yetter Manufacturing Co. Colchester, Ill. publication 9/85.

Primary Examiner—Richard J. Johnson
Assistant Examiner—Danton DeMille
Attorney, Agent, or Firm—Henderson & Sturm

[57] ABSTRACT

A combination coulter and fertilizer knife apparatus for applying fertilizer to the soil including a frame having a coulter rotatably attached to the frame along a substantially horizontal axis for the purpose of cutting a slot in the soil. A fertilizer knife is attached to the frame rearwardly of the coulter, the front edge of the fertilizer knife being of substantially the same arcuate shape as an adjacent portion of the edge of a circular coulter and slightly spaced from such coulter. A conduit is attached along the rear edge of the fertilizer knife, terminating in an outlet opening adjacent the lower edge of the fertilizer knife and the top thereof leading to a supply of liquid or gaseous fertilizer. Consequently, the combination coulter and fertilizer knife is useful to cut a trench in the ground, and then to permit liquid or anhydrous ammonia fertilizer to be inserted into such trench without having trash or other objects interfere with such operation.

1 Claim, 6 Drawing Figures

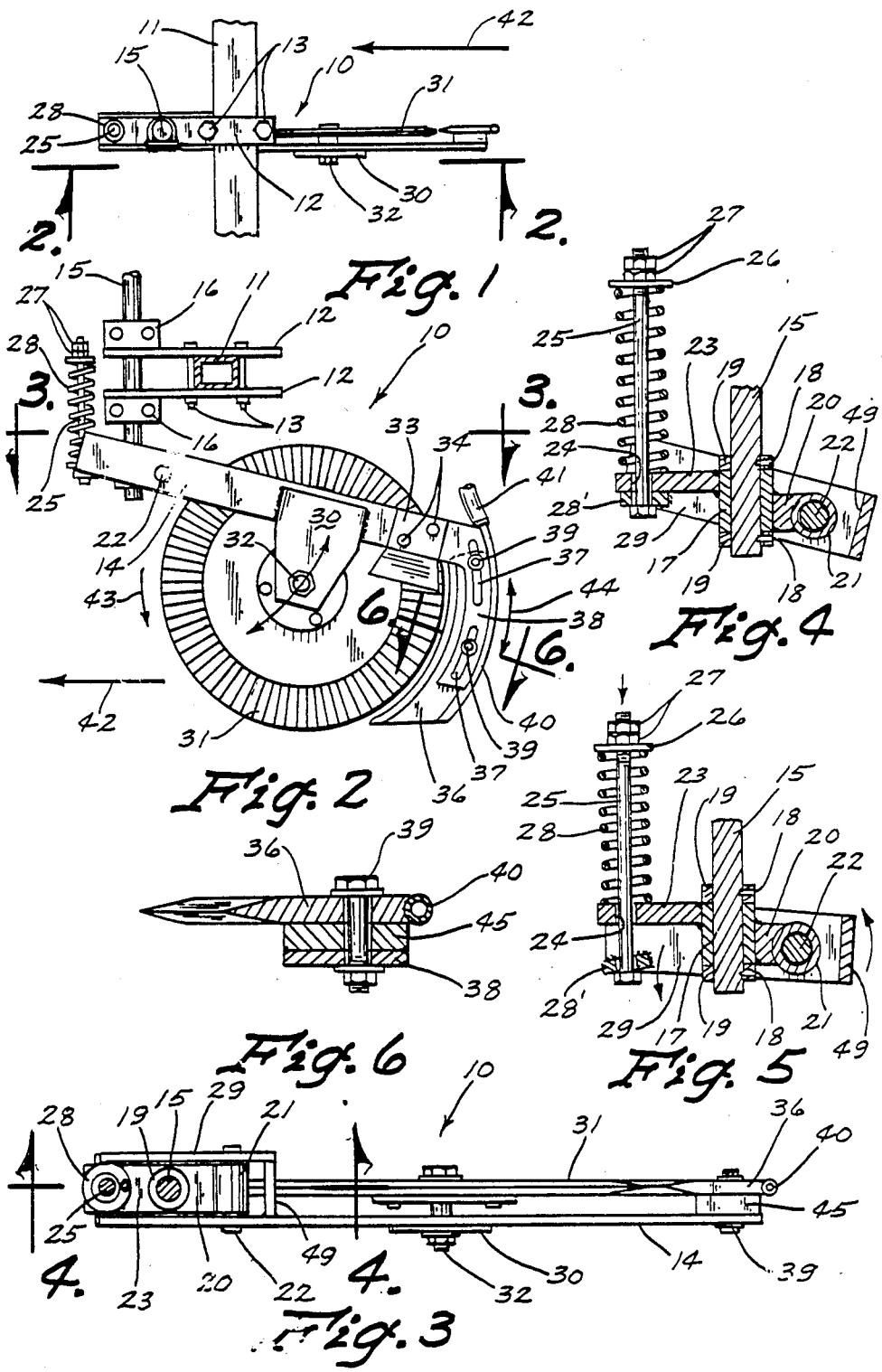

4,628,840

COMBINATION COULTER AND FERTILIZER KNIFE APPARATUS

TECHNICAL FIELD

The present invention relates generally to a combination coulter and fertilizer knife apparatus for attachment to tool bars, planters and other implements, and more particularly for such devices used in minimum tillage operations for applying liquid fertilizer or anhydrous ammonia fertilizer or the like.

BACKGROUND ART

In the application of fertilizer in minimum tillage operations, one of the most common problems is the accumulation of trash, such as corn stalks or the like, onto such fertilizer knife.

Another problem associated with minimum tillage application of fertilizer or the like is contact with obstructions which interfere with the application of fertilizer or contact with objects which will damage the fertilizer knife or the like.

Consequently, there is a need for improved combination coulter and fertilizer knives which will alleviate the aforementioned problems with the prior art.

DISCLOSURE OF THE INVENTION

The present invention relates to a combination coulter and fertilizer knife apparatus for applying fertilizer to the soil including a frame having a coulter rotatably attached to the frame along a substantially horizontal axis for the purpose of cutting a slot in the soil. A fertilizer knife is attached to the frame rearwardly of the coulter, the front edge of the fertilizer knife being of substantially the same arcuate shape as an adjacent portion of the edge of a circular coulter and slightly spaced from such coulter. A conduit is attached along the rear edge of the fertilizer knife, terminating in an outlet opening adjacent the lower edge of the fertilizer knife and the top thereof leading to a supply of liquid or gaseous fertilizer. Consequently, the combination coulter and fertilizer knife is useful to cut a trench in the ground, and then to permit liquid or anhydrous ammonia fertilizer to be inserted into such trench without having trash or other objects interfere with such operation.

An object of the present invention is to provide an improved apparatus for applying liquid fertilizer or anhydrous ammonia fertilizer into a trench in the ground.

Another object of the invention is to provide an improved apparatus for minimum tillage operations for cutting a trench and applying fertilizer and preventing build-up of trash or the like.

A further object of the invention is to provide a combination coulter and fertilizer knife of the aforementioned type which will not be damaged when encountering rocks or other objects in the soil.

A still further object of the invention is by the combination coulter and fertilizer knife which will pivot upwardly and downwardly when objects are encountered, while at the same time being able to pivot from side to side.

Other objects, advantages and novel features of the present invention will become apparent from the following detailed description of the invention when considered in conjunction with the accompanying drawings.

BRIEF DESCRIPTION OF THE DRAWINGS

FIG. 1 shows a top plan of a combination coulter and fertilizer knife constructed in accordance with the present invention;

FIG. 2 is a side elevational view taken along line 2—2 of FIG. 1;

FIG. 3 is a cross sectional view taken along line 3—3 of FIG. 2;

FIG. 4 is a cross sectional view taken along line 4—4 of FIG. 3;

FIG. 5 a view like FIG. 4, but showing the movement of the biasing structure when a rock or other hard object is encountered, causing the coulter and knife to pivot upwardly; and FIG. 6 is a cross sectional view taken along line 6—6 of FIG. 2.

BEST MODE FOR CARRYING OUT THE INVENTION

Referring now to the drawings wherein like reference numerals designate identical or corresponding parts throughout the several views, FIG. 1 shows a combination coulter and fertilizer knife (10) constructed in accordance with the present invention and being attached to a tool bar (11).

Referring now to FIGS. 1 and 2, it is noted that mounting plates (12) are bolted to the tool bar (11) by nut and bolt fasteners (13). A frame (14) is pivotally mounted along the axis of the shaft (15) by clamps (16) which hold the shaft in the desired vertical position with respect to the plates (12). A bearing structure (17), as shown for example in FIG. 4, permits the frame (14) to pivot along the axis of the shaft (15). The relative vertical position of the shaft (15) with respect to bearing (17) is maintained by set screws (18) on collars (19), wherein the set screws (18) prevent movement of the sleeves (19) with respect to the shaft (15). It will of course be understood to those skilled in this art that other types of rotary connections between the frame (14) and the vertical shaft (15) can be made without departing from the spirit and scope of the present invention.

The bearing structure (17) is attached to a member (20) in a rigid fashion, and this member (20) is, in turn, rigidly attached to a second bearing-type structure (21), as can best be seen in FIGS. 4 and 5. This second bearing structure (21) serves to pivotally attach the frame (14) along a horizontal axis coinciding with the longitudinal axis of a pivot pin (22). An extending biasing bracket (23) is rigidly attached to the bearing structure (17) and has an opening (24) disposed therein for reception of a bolt (25) extending therethrough. A washer (26) is held in place on the bolt (25) by nuts (27). A compression spring (28) pushes against the bracket (23) at the bottom thereof and upwardly against the washer (26) at the top thereof. This has the effect of biasing the left-most end of the frame (14), through a member (28') rigidly attached to the left-most end of the frame (14) as viewed in FIG. 2, upwardly thereby causing the right-most portion of the frame (14) to be biased downwardly.

A bracket (30) is welded to an intermediate portion on the frame (14), as can readily be seen in FIG. 2. A flat disc or coulter (31) is rotatably attached to the bracket (30) so it can rotate along the axis of a nut and bolt assembly (32). Conventional bearings (not shown) are utilized to reduce friction in such rotation.

A scraper (33) is rigidly attached to the frame (14) by nut and bolt assemblies (34) so that the scraper (33) will clean the disc (31) as the disc (31) rotates thereby preventing a build-up of dirt and mud thereon.

A fertilizer knife (36) is attached to the rear, or rightmost end, of the frame (14) as viewed in FIG. 2. This fertilizer knife (36) has a leading edge which follows the contour of the adjacent edge of the coulter or disc (31). This fertilizer knife (36) can be adjusted upwardly or downwardly because of slots (37) formed in mounting brackets (38), whereby nut and bolt fasteners (39) can be loosened and the fertilizer knife (36) can be moved upwardly or downwardly within the limits of the slots (37). When the fertilizer knife (36) is at a desired position with respect to the frame (14), then the nut and bolt assemblies (39) can be tightened down to hold the fertilizer knife (36) in the desired position. A rigid tube (40) is welded to the rear or following edge of the fertilizer knife (36) and terminates at the lower end thereof in an opening for discharging liquid fertilizer or anhydrous ammonia fertilizer and has an upward end for connection to a flexible hose (41) or the like, which leads to a supply of fertilizer.

In operation, the combination coulter and fertilizer knife (10) would be attached to a tool bar (11) which, in turn, can have other implements attached thereto, such a minimum tillage or no-till planters or the like. As the tool bar (11) and the associated invention (10) is moved forwardly to the position of the arrow (42) as shown in FIG. 1, the disc or coulter (31) will rotate in the direction of the arrow (43) shown in FIG. 2. This action will cause the disc (31) to cut through the soil, especially since the lower-most end of the frame (14) will be biased downwardly, thereby causing the disc or coulter (31) and fertilizer knife (36) to also be biased downwardly toward the soil. Consequently, trash such as corn stalks or the like will be cut through by the sharp edges of the disc (31) to cut a trench. The disc (31) will then be followed by the fertilizer knife (36), which will be adding fertilizer on the rear discharge edge of tube (40) as it proceeds. If the rows are not precisely straight, then the combination coulter and fertilizer knife apparatus will automatically pivot accordingly about the vertical axis of the shaft (15) to accommodate such variations in row curvature. Furthermore, if it should happen that rocks or other impenetrable objects are encountered, then these objects will be avoided by a pivoting of the frame (14) about the axis of the vertical shaft (15) to permit side-to-side movement of the disc (31) and fertilizer knife (36). Furthermore, if side-to-side movement will not avoid contact with such objects, then the entire apparatus, including the coulter (31) and fertilizer knife (36), will be permitted to pivot upwardly about the axis of the horizontal pin (22) in the direction of the arrow (44) as shown in FIG. 2, and as also illustrated by the movement from FIG. 4 to FIG. 5 position. Then after such object has been passed over, the action of the compression spring (28) will again bias the frame (14) to the position shown in FIGS. 2 and 4, whereby the coulter (31) and fertilizer knife (36) are again biased downwardly into the soil.

Accordingly, it will be appreciated that the preferred embodiment shown in the drawings and explained above does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. Apparatus for applying liquid fertilizer to the soil comprising:

a tool bar;

plate means for being laterally adjustably attached to said tool bar with respect to the forward movement of said tool bar;

an elongated rigid frame, said elongated rigid frame being straight from one end to the other end except for a downwardly depending portion on said other end;

means for pivotally attaching said frame to said plate means along a substantially vertical axis;

horizontal pivot means for pivotally attaching said frame to said vertical pivot means along a first substantially horizontal axis;

biasing means operatively connected to one end of said frame and to said vertical pivot means for biasing the other end of said frame member to a first lowered pivotal position thereof and permitting said frame to be pivoted to a second raised pivotal position thereof;

coulter means rotatably attached to an intermediate portion of said frame along a second substantially horizontal axis for cutting a slot in the soil, said coulter means including a substantially flat disc which rotates as it is forced through the soil;

fertilizer knife means attached to the other end of said frame for extending into said slot formed in the soil, the front edge of said fertilizer knife means being substantially of the same arcuate shape as an adjacent rear portion of said disc and being adjacent to and slightly spaced from said adjacent rear portion of said disc;

substantially vertically extending arcuately shaped slots disposed in the downwardly depending portion on said other end of said frame for adjustably receiving fasteners extending through openings in said fertilizer knife means for vertically adjusting the vertical position of said fertilizer knife means with respect to said other end of said frame;

scraper means attached to said frame between said other end and said intermediate portion thereof for scraping dirt from said disc as said disc rotates; and conduit means leading from a source of liquid fertilizer, extending along the rear edge of said fertilizer knife means, and terminating in an outlet opening adjacent the lower rear edge of said fertilizer knife means for releasing the liquid fertilizer into said slot in the soil.

* * * * *